Dec. 7, 1965  W. H. GORDON, JR  3,222,497
ELECTRICALLY HEATED BEDCOVER
Filed April 30, 1963
FIG. 1
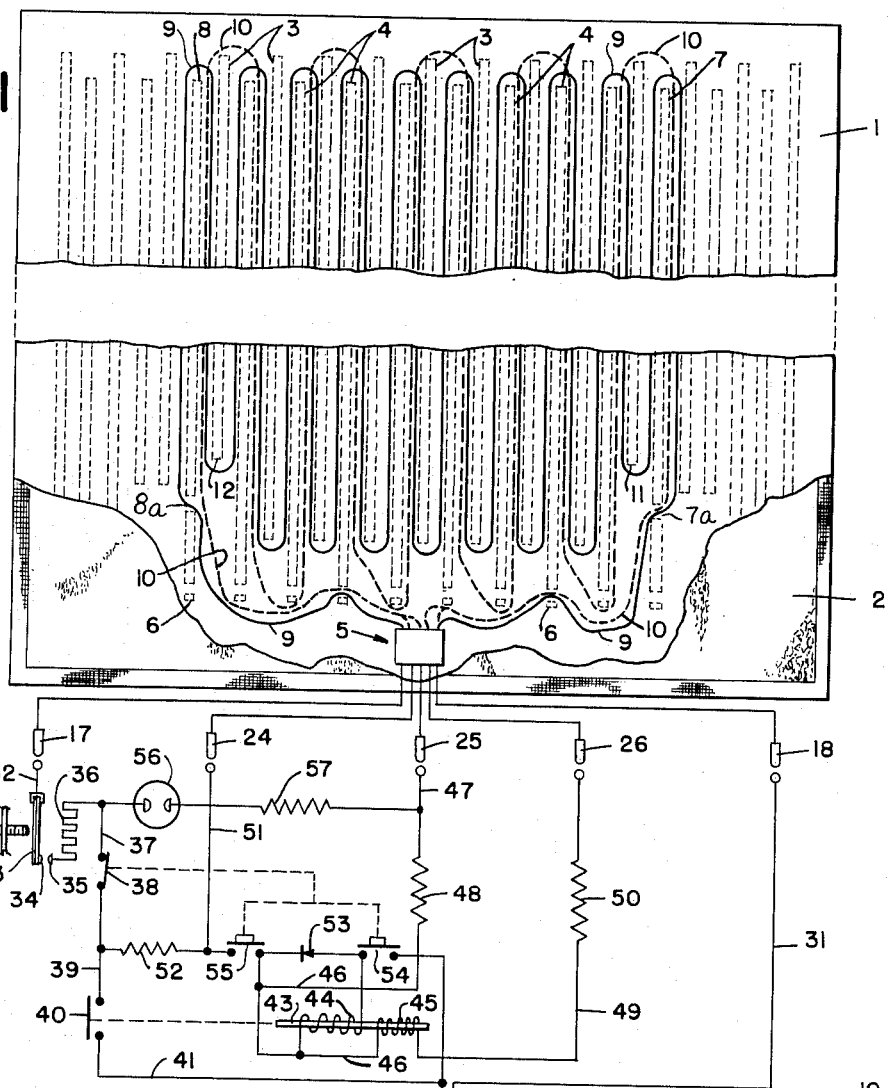
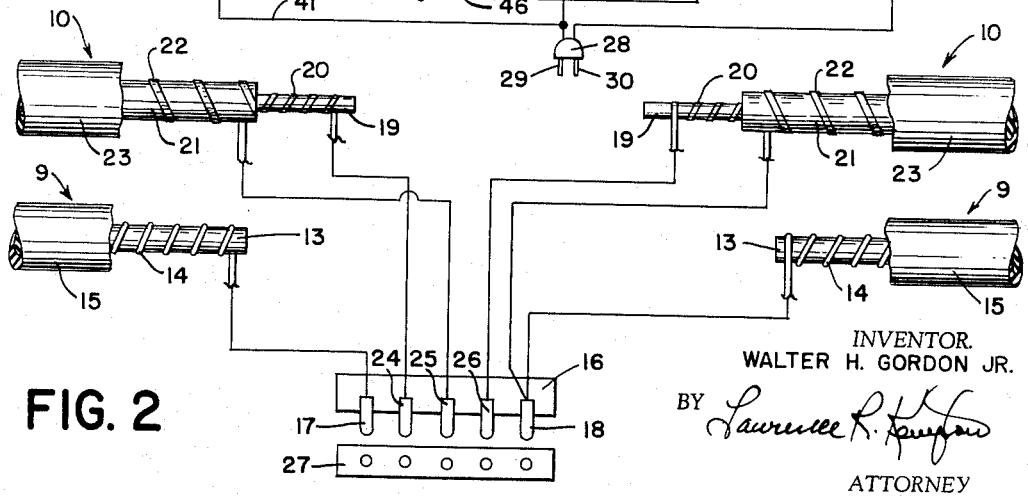
FIG. 2
INVENTOR.
WALTER H. GORDON JR.
BY *Lawrence R. Langford*
ATTORNEY

United States Patent Office 3,222,497
Patented Dec. 7, 1965

3,222,497
ELECTRICALLY HEATED BEDCOVER
Walter H. Gordon, Jr., Asheboro, N.C., assignor to General Electric Company, a corporation of New York
Filed Apr. 30, 1963, Ser. No. 276,931
2 Claims. (Cl. 219—212)

This invention relates to flexible electrically heated devices, such as bedcovers, and particularly to the heating and temperature sensing control means for such a device.

Electric bedcovers and blankets typically include electric heating means distributed over the heated area of the blanket, with operation of the heater thermostatically controlled from an adjustable bedside control unit which varies the proportion of the time on responsive to room temperature and the selected setting by the user. Such operation is entirely satisfactory so long as the heated area is uniformly spread out over the bed, and no area of the blanket is covered or enclosed in a manner to limit dissipation of heat emanating from the heating means. If any portion of the heated area is covered, for example by a pillow or other bedcovers, a substantial temperature rise may occur in that limited portion, because of the fact that heat is emanating from the electric heating means without normal dissipation into the air and the room. As a practical matter, it is known that this heat rise may reach dangerous proportions, resulting in a risk that the blanket material may scorch; and ultimately burning might take place. Such a risk cannot be tolerated with respect to an electric bedcover.

One approach to elimination of the overtemperature problem has been the incorporation of thermostatic switches within the blanket in series with the heating wire. These switches are so constructed that the heating circuit is opened if one of the thermostats happens to be in a location which is subjected to an abnormally high temperature. However, if the high temperature occurs at a location not protected by a thermostat, the danger still exists; or, similarly, if the contacts of a thermostatic switch stick in the closed position, the dangerous overtemperature condition may not be detected and rectified.

Another construction which has been commercially successful involves the use of a heating wire in close proximity to a signal wire, with a layer of material therebetween, which becomes conductive upon occurrence of an abnormally high temperature, with this conduction through the control layer operating through a suitable control circuit to de-energize the entire blanket. Such a construction is disclosed and claimed in Patent Number 2,581,212, Spooner and Greenhalgh, assigned to the General Electric Company, assignee of the present invention. While the combined heating and signal wire construction of the aforesaid Patent 2,581,212 has been highly successful, it has given rise to certain practical manufacturing problems and expense in selection of materials in order to provide a bedcover with long life and consistent sensitivity in detecting and eliminating abnormal temperature conditions.

An object of the present invention is to provide an electrically heated bedcover in which the heating means and the continuous temperature sensitive means are separate from one another, while still providing a high degree of sensitivity continuously over the entire heated area for overheat protection for every portion of the heated fabric.

Another object of this invention is to provide an improved temperature sensing means having long life and consistent reliability to de-energize the heating means upon occurrence of an abnormal temperature at any location over the heated area of the device.

Still a further object of this invention is to provide an electrically heated bedcover and overtemperature detection system therefor, having improved reliability and which can be manufactured at a lower cost.

Briefly stated, in accordance with one aspect of my invention, there is provided an electrically heated bedcover which has a temperature sensor distributed over the heated area of the bed cover, and the temperature sensor is separate from the heater. The sensor comprises two conductors separated from each other by a flexible material having a negative temperature coefficient of resistance. This material is essentially an insulator at normal operating temperatures of the bedcover. When, however, an overtemperature condition exists in any portion of the bedcover, the material conducts current of control magnitude to cause de-energization of the heater through an appropriate control system.

The subject matter which I regard as my invention is particularly pointed out and distinctly claimed in the concluding portion of this specification. My invention, however, both as to organization and method of operation, together with further objects and advantages thereof, may best be understood by reference to the following description taken in connection with the accompanying drawing in which:

FIG. 1 is a somewhat schematic view of an electrically heated bedcover with a portion broken away to illustrate internal details and including a schematic electrical control diagram for use with such a bedcover; and FIG. 2 is an enlarged view of a portion of the electrically heated bedcover adjacent the electrical connection plug to illustrate more clearly the details of the construction.

Referring now to the drawing, FIG. 1 illustrates an electric bedcover of the type in which the blanket shell is made up of two plies 1 and 2. In practice, it has been found desirable to secure the electrical wiring for the bedcover within channels between the two plies, which allows some limited freedom of movement of the electrical wires with respect to the fabric. For this purpose, the two plies are connected together, for example along spaced lines, by stitching or weaving, thus providing a series of dividers, such as 3 and 4, shown by the drawing. Typically, the dividers 3 are extended with respect to the ends of dividers 4 at the head end of the blanket; while the dividers 3 are shorter than the dividers 4 at the foot end of the blanket, at which is located the strain relief and connection device 5. For an electric blanket made of woven material, processes are well known by which the two plies of material can be woven together along the divider lines during the weaving process. For bedcovers made up of other material, stitching or other means of securement of the two plies of the fabric could obviously be used. Adjacent the foot end of the blanket the plies are shown as connected together by a series of spaced points 6 in line with, but separate from the main dividers. In addition, it is preferred to provide a break in the dividers 7 and 8 at the right and left hand sides of the heated area, as indicated at 7a and 8a in the drawing.

The series of dividers as above described provide channels between the two plies of the blanket fabric to receive electrical heating means and control wires in accordance with this invention. In FIG. 1, the electrical heating wire 9 is shown in full lines passing back and forth through the channels, for example in a serpentine fashion. It should be noted particularly that in accordance with this invention the heating wire 9 always passes around the short ends of the various dividers; and from an examination of FIG. 1, it can be seen that the heating wire thus extending back and forth through the channels and around the short ends of the dividers defines a heated area for the bedcover. In the usual manner, a portion of the bedcover at the head end and at the foot end is not wired, and similarly unwired portions are provided as the side flaps for the blanket. In order to provide reasonably uniform heating effect over the entire heated area of the bedcover, I prefer to have the heating wire 9 pass through every channel in the serpentine manner as shown. Thus, one continuous length of heating wire extends from one side of the blanket strain relief and terminal block 5 through the blanket and back to the other side of the terminal block.

In accordance with this invention, the overtemperature protection for the blanket is provided by a continuous overtemperature wire assembly 10 as shown in dotted lines in FIG. 1. It should also be noted that this overtemperature wire assembly extends back and forth through selected channels of the blanket shell, and in each case passes around the longer ends of the channel dividers. Thus, this separate sensor or control wire extends over a larger area of the blanket, encompassing and overlapping the heated area, so that there is always a length of the sensor wire assembly within a very short distance of the heating wire. Also, if any portion of the heating wire should become somewhat dislodged from the end of a divider, there is essentially no risk that such heating wire could become located in an unprotected area of the blanket. In the particular embodiment of FIG. 1, the sensor wire is shown extending through every other channel of the bedcover. Thus, certain of the channels contain only a heating wire, while other channels contain both a heating and a sensor wire. In practice, this is found to be completely adequate for overtemperature protection, even on the length of wire extending through those channels which include only a heating wire. For example, in one construction found in practice to be satisfactory, the dividers were approximately three-quarters of an inch wide, with a spacing of one and one-quarter inches between adjacent dividers. With such a construction, a heater wire can never be more than approximately two inches from an adjacent sensor wire on one side or the other. Since, as a practical matter, even a localized overtemperature condition occupies an appreciable area, such a construction insures that a sensor wire will be located within the area of the overheat.

At the foot end of the bed, it is, of course, necessary to interconnect the outer wired channels with the centrally located connection block 5. As shown in FIG. 1, I prefer to pass both the heating and signal wires through gap 7a in channel divider 7. Additionally, on the right-hand side of the blanket, it is desirable to maintain both the heater and the signal wire in proximity to one another along the foot of the bed, and for this purpose, both wires are passed through the small space between the end of at least one of the channel dividers 4 and the corresponding spot connection 6. Similarly, on the left-hand side of the blanket, as shown in FIG. 1, the heating wire is brought through the slot 8a at the end of channel divider 8, and both the heating and the signal wires similarly pass in the small space between a channel divider 4 and one of the connection points 6. In addition, it is always desirable that adjacent convolutions or passes of the heater wire be spaced from one another under all conditions, since otherwise an undesirable local heating condition might occur. Thus, the dividers adjacent slots 7a and 8a are particularly short, as shown at 11 and 12, in order to achieve the desired spacing between adjacent heating wire. Thus, it can be seen that the heating wire distributed over an area of the blanket defines a heated area which is totally encompassed and overlapped by a control area which is occupied by the signal wire 10. This is achieved by the use of the short and long dividers with the heating wire in every instance passing around the short ends, while the signal wire passes in each instance around the long ends. Obviously, this same arrangement could be applied even if the signal wire passed through every third or fourth channel, or every channel, rather than every other channel as shown by FIG. 1.

The specific construction of the heater and signal wires will be more apparent from a reference to FIG. 2. The heater wire comprises a core 13 of insulating material around which is spiralled electrical resistance wire 14, over which is extruded an outer insulating jacket 15. Typically, the insulating core 13 is made of glass fibers or rayon fibers, or some equivalent material. This core gives the assembly the desired tensile strength and also forms a base upon which can be spiralled the heating wire, with this construction offering substantial flexibility, commensurate with the flexibility of the blanket fabric itself. For a single bed blanket, the wire size and alloy is selected to provide a total resistance for the heater wire in the order of 100 ohms, so that when the blanket is energized on 115 volts, the heat dissipation from the blanket totals approximately 120 to 130 watts. The outer insulating jacket may be any suitable insulating compound, such as polyvinyl chloride, which includes a suitable high temperature plasticizer which does not degrade at normal operating temperatures for the heating wire. As shown in FIGS. 1 and 2, the opposite ends of resistance wire 14 making up heating wire assembly 9 extend to a terminal block 16 (FIG. 2) and are connected to the outer pins 17 and 18 mounted therein. This provides a means by which electrical power may be supplied from the power line through the heating wire, as will be described hereinafter.

Details of the signal wire construction are also shown in FIG. 2. Again, a suitable insulating core 19 of glass, rayon, or equivalent insulating fibers, forms a base upon which a first length of wire 20 may be wrapped. In practice, 40 to 45 turns per inch of flattened wire size A.W.G. 34, having reasonably good electrical conductivity, is applied as first wrap 20. After the first wrap has been applied, a layer of especially compounded temperature sensing material 21 is extruded over the combined core and first wrap 20. The material for the extrusion 21 is a suitable plastic insulating compound to which an ionic compound is added, so that the layer 21 is normally an electrical insulator, but upon elevated temperature becomes a conductor of currents of control magnitude. A number of base materials are known to be suitable for the layer 21, such as nylon, acrylonitriles, and similar thermoplastic compounds which possess the desired flexibility and which normally are electrical insulators. In practice, I have found that polyvinyl chloride is suitable operationally and also offers an advantage over many other compounds in that it is relatively low in cost. In accordance with usual practice, the polyvinyl chloride must include a suitable plasticizer, and I prefer to use pentaerythritol or dipentaerythritol esters in the amount of 20% to 40% by weight of the polyvinyl chloride. Such a composition has certain advantages as described and claimed in Patent Number 2,941,176, also assigned to General Electric Company, assignee of the present invention. In order that the insulation material 21 may provide suitable temperature sensitive characteristics, a suitable ionic additive material is compounded with the insulating compound. Such a wire construction with a temperature sensing layer including an ionic additive is disclosed and claimed in Patent 2,846,560 assigned to the General Electric Company. Specifically, for the present application, we have found in practice that one operative embodiment includes the addition of 3% by weight of an ionic material, specifically stearyldimethylbenzyl ammonium chloride. As a practical matter, this material is purchased from the Rohm and Haas Company as their compound Triton X–400, which, it is understood, comprises 75% water and 25% solid stearyldimethylbenzyl ammonium chloride.

With further reference to the sensor wire, a second electrical conductor is wrapped around the outside of the temperature sensing layer 21. In a practical embodiment, and by way of example only, we have wrapped 22 to 24 turns per inch of previously flattened wire (size A.W.G. 34) around the temperature sensing layer; and preferably the direction of spiral of wrap 22 with respect to conductor 20 is in the opposite direction. Thus, at all times there is a relatively thin section of temperature sensing material 21 between conductor 22 and conductor 20. While I have illustrated concentric wraps of oppositely spiralled wire with the temperature sensitive layer interposed, there are other constructions which could be used. For example, one or both conductors could be encased in the temperature sensitive compound and then spiralled in parallel on the core. The essential requirements are flexibility and an arrangement of the two conductors in contact with and separated by a relatively thin layer (e.g. .010″) of the temperature senstive material.

Finally, this entire assembly is covered with an outer insulating jacket 23. In practice, we prefer to use an identical insulating compound for jacket 23, corresponding to the compound used for the layer 21, except that for the outer insulating jacket the ionic additive material is omitted. In other words, in a preferred form we have used, by way of example, polyvinyl chloride, including the plasticizers selected from the class of pentaerythritol and dipentaerythritol esters in the amount of 20% to 40% by weight of the polyvinyl chloride. In practice, we have found that if different compounds are used for the insulating material of the outer jacket 23 and the layer 21, a change in characteristics occurs as a function of time. While the exact reasons for the changes are not fully understood, it is believed that a migration of the plasticizers may take place, which, however, is prevented if the basic compounds for both the outer jacket 23 and the layer 21 are identical, except for the ionic additive included in this sensing layer 21, as above described.

As shown most clearly in FIG. 2, electrical connections are made to the inner and outer wraps of the sensor wire at the terminal block 16. One end of inner wrap 20 is connected to a terminal pin 24, while the opposite end of the inner wrap is connected to terminal pin 26. Similarly, the outer wrap is connected at one end to terminal pin 25, while the opposite end of the outer wrap is connected to terminal pin 18 along with one of the terminals of the heater wire 14. In this manner, a detachable electrical connection can be made to a multiple conductor cable leading to a bedside control, presently to be described, through the receptacle 27, FIG. 2.

The specific electrical control system disclosed herein by way of example does not form a part of my invention, but is the subject matter disclosed and claimed in a copending application of William D. Ryckman, Jr., application Serial Number 276,930, filed concurrently herewith and assigned to the General Electric Company, assignee of the present application. However, the operation and utility of the present invention may be better understood by a brief description of such an electrical control circuit found to be useful and practical and now described in connection with the schematic representation of FIG. 1.

Referring now particularly to the schematic control system illustrated in connection with FIG. 1, electric power is supplied from the usual A.C. outlet to a plug 28 providing electrical connection to the two sides 29 and 30 of a 115 volt power source. The heating circuit is energized through a circuit commencing with line 30 at the power plug, through a connecting conductor 31 to terminal pin 18 leading to the right-hand end of electric heater wire 9. The opposite end of the electric heater wire is connected to terminal pin 17 of the bedcover, from which connection is made through conductor 32 to an ambient responsive control assembly in the bedside control. In the usual manner, the ambient responsive control includes a bimetallic blade 33, carrying on one end a contact 34 adapted to engage a cooperating contact 35 associated with one end of a heater 36 oriented in close proximity to bimetallic blade 33. When the bimetallic blade deflects to the right, responsive to a relatively cool temperature, the circuit is completed through contacts 34 and 35 to conductor 37, a normally closed safety switch 38, conductor 39, a relay switch 40, and conductor 41 back to the other side of the power supply. Thus, electric current flows through the heating wire and through bimetallic blade 33 of the ambient responsive control along with heater 36, the safety contacts, and the relay contacts. As this electric current causes heat to emanate from the heating wire in the blanked, heater 36 also warms bimetallic blade 33, causing it to deflect to the left to open the circuit. Thereafter the bimetallic blade cools and the circuit again closes, with cycling occurring to maintain the desired temperature of the bedcover. Suitable adjustment means 42 may be associated with the ambient responsive control, whereby the user can select the temperature at which cycling occurs and thus can select the average temperature maintained by the electric bedcover.

Under normal circumstances, the electric bedcover operates in the above described manner, with the ambient responsive control regulating the percent time "on" of the electric heater within the bedcover, responsive to the manual setting and the temperature within the room in which the blanket is operating. Relay switch 40 ordinarily remains closed, so that electric power is connected to the heating element whenever switch 34–35 of the ambient responsive control is closed. However, under certain circumstances, a serious overtemperature condition can exist at a small or localized area of the blanket, while the rest of the blanket is operating normally and the ambient responsive control is closed, calling for additional heat. It is under these circumstances that the separate sensor assembly 10 and the related control circuit become of critical importance to the user. Under normal operation, relay switch 40 is maintained closed magnetically from core or armature 43 of the relay on which are two coils 44 and 45. In practice, the two coils may be made up simply of a center tapped single coil, thus providing two sections 44 and 45 having a common terminal and conductor 46. Relay coil 45 is energized through the following circuit: from power conductor 30 and conductor 31, through connector pin 18 to the right-hand end of the sensor wire, with a connection being made at this point to the outer wrap 22, as clearly shown in FIG. 2. The electric circuit then continues through the blanket through outer wrap 22 of sensor wire 10 to the left-hand end of strain relief block 5, with connection then being made into terminal pin 25, again as shown in FIG. 2. Terminal pin 25 is adapted to make connection through a conductor 47 to a resistor 48, which will be hereinafter referred to as the "start" resistor. The opposite end of start resistor 48 is connected through the common conductor 46, to the relay coils 44 and 45. Considering now only relay coil 45, the circuit is completed through conductor 49, an impedance matching resistor 50 to terminal pin 26, which makes connection with inner wrap 20 of the signal wire 10. The opposite end of the inner wrap of the signal wire is connected through terminal pin 24 of the electrical connector, from which current flow may continue through conductor 51 and a voltage dropping resistor 52 to conductor 39, from which the circuit is completed to the other side of the power line through the relay switch and conductor 41. The other relay coil 44 is connected in a closed circuit in which is included a semiconducting device 53, by which means the relay operates without hum on alternating current, all as described in the aforesaid copending Ryckman application, Serial Number 276,930. Thus, power is supplied to the other portion 44 of the relay winding by transformer action.

In connection with this circuit for energization of relay winding 45, it should be noted particularly that the electric circuit includes both inner wrap 20 and outer wrap 22 of the separate sensor assembly 10. Thus, in case of a break or failure at any point along separate sensor assembly 10, the circuit to the relay is opened, and relay switch 40 opens, shutting off the power to the blanket. This is an important fail-safe feature of the present circuit.

While there are various ways in which the relay could be initially energized for closure of switch 40, it is preferred to energize the relay electrically by means of an on switch 54 which may be momentarily depressed to close the switch and energize the relay. This relay pick-up circuit may be traced commencing with power supply pin 30, conductor 31, connector pin 18, outer wrap 22 of the separate signal wire assembly, through the outer wrap to terminal pin 25, conductor 47, start resistor 48, to conductor 46 forming one of the terminal ends of relay coil 44; then from the opposite end of relay coil 44, through the start switch 54, to the opposite side of the power supply. In this instance, the start resisor 48, having a resistance of 4500 to 5000 ohms, protects the circuit against an excessive current flow, while allowing sufficient current to flow through relay winding 44 to cause the initial pick-up of the relay.

The momentary on button 54 is connected mechanically to a safety switch 38 in a manner to open the safety switch whenever the on button is depressed. The safety switch is in the main electric heating circuit, as previously described, and thus the main heating circuit remains ineffective whenever the on button is depressed to its closed position. This, again, is an important safety feature of the circuit, whereby a user cannot defeat or bypass the safety circuit by jamming the on switch closed. In other words, the on switch must be released in order to close safety switch 38 before electric power can be supplied to the main heating element. Once the relay has been energized through its winding 44, it remains energized through the combination of windings 45 and 44, as previously described, and thus the relay switch 40 is closed, and electric power can be supplied through the ambient responsive switch to the heating element within the bedcover.

As above described, the circuit which holds the relay closed includes the voltage dropping resistor 52, the inner wrap of the separate signal wire assembly, resistor 50, relay coil 45, start resistor 48, and the outer wrap of the separate signal wire assembly. Under normal operating conditions, there is essentially no current flow through the temperature sensitive layer between the inner wrap and the outer wrap of the signal wire assembly. Under these circumstances, the values of the resistors are so selected in connection with the relay design that sufficient voltage remains on relay coil 45 to maintain the relay switch 40 in its closed position. Upon any abnormal temperature at any point or length along the signal wire assembly, current flow does occur through the layer 21 between the inner wrap and the outer wrap. Under these circumstances, a greater proportion of the total line voltage will appear across the voltage dropping resistor 52 and less voltage will be on relay coil winding 45. The resulting drop in energization of the relay coil results in the magnetic release of relay armature 43, upon which relay switch 40 opens to terminate further operation of the bedcover and completely remove power from its heating unit. The bedcover does not again function until such time as the user manually closes switch 54.

There are various ways in which the relay may be de-energized manually when it is desired to turn off the electric bedcover. For example, the relay switch 40 might be manually opened. However, I prefer an electrical turn-off by means of a momentary off switch 55. As shown in the schematic circuit of FIG. 1, when off switch 55 is manually depressed to close the circuit through this switch, coil 45 along with the impedance matching resistor 50 and the inner wrap of the signal wire assembly are short circuited. The overall control circuit is still protected, however, since the resistor 52 remains in the circuit along with start resistor 48. However, when the off switch 55 is depressed, essentially no voltage appears across the relay winding 45, and hence the relay releases its armature 43 and relay switch 40 opens.

Satisfactory operation of this overtemperature control circuit requires a carefully calibrated relay. The relay life will be prolonged if the relay switch 40 is not used frequently to open and close the circuit while power is flowing through the heater wire. Thus, I prefer to use the arrangement of the aforesaid Ryckman patent application, Serial Number 276,930, in which the off switch 55 is mechanically coupled to safety switch 38, to open the safety switch slightly before the off switch is closed. In this way, current flow is interrupted by safety switch 38 prior to the opening of relay switch 40.

The user frequently desires some visual indication that the blanket circuit is operating. For this purpose, it is common practice to provide a suitable indicator light, such as a neon glow lamp 56. In a conventional manner, a current limiting resistor 57 is connected in series with the glow lamp. The circuit for energizing the glow lamp may be traced from power supply pin 29, conductor 41, relay switch 40, conductor 39, safety switch 38, the neon glow lamp 56, current limiting resistor 57, conductor 47, pin 25, the outer wrap of the temperature sensor wire assembly, to the other side of the power supply pin 30 through pin 18 and conductor 31. Thus, whenever the relay switch 40 is closed and the safety switch 38 is closed, the glow lamp 56 will be energized, signifying to the user that the bedcover is energized.

One of the advantages of the above-described arrangement is that electric heat is not applied directly to the temperature sensing layer 21. With this arrangement, the temperature sensor wire assembly is separate from the electric heater, although it is distributed over the heated area of the blanket in a manner to sense any abnormally high temperature and de-energize the bedcover, if necessary. Such a construction increases the long term reliability of the circuit. Another important factor leading to the reliability involves the construction of the separate sensor wire assembly, itself, utilizing identical basic compounds for the sensing layer and the outer insulating jacket, achieving temperature sensitivity by the small amount of ionic additive in the temperature sensing layer 21.

While the present invention has been described with reference to a particular embodiment thereof, it is to be understood that numerous modifications may be made by those skilled in the art without actually departing from the invention. It is, therefore, the aim of the appended claims to cover all such equivalent variations as come within the true spirit and scope of the foregoing disclosure.

What I claim as new and desire to secure by Letters Patent of the United States is:

1. An electrically heated bedcover comprising:
   (a) a fabric blanket shell;
   (b) an electric heater distributed over said shell to provide an electrically heated area;
   (c) a temperature sensor extending over the entire heated area of said shell independently of said heater and in a pattent to sense any abnormally high temperature of any portion of said heater,
      said temperature sensor including a pair of low resistance conductors in closely spaced relation separated by an insulating material comprising a basic plastic compound and an ionic additive thereby to provide a continuous flexible layer between said conductors which is essentially an insulator at normal operating temperatures and conducts currents of control magnitude at temperatures above normal;

(d) and a control system to de-energize said electric heater responsive to temperature sensitive current flow through any portion of the layer of said temperature sensor.

2. The bedcover recited in claim 1 wherein the temperature sensor includes an outer jacket of the same basic plastic compound as the sensor insulating material.

References Cited by the Examiner

UNITED STATES PATENTS

| | | | |
|---|---|---|---|
| 2,203,918 | 6/1940 | Moberg | 219—212 |
| 2,543,620 | 2/1951 | Anderson et al. | 219—212 |
| 2,846,560 | 8/1958 | Jacoby et al. | 219—542 |
| 2,959,662 | 11/1960 | Crowley et al. | 219—212 |
| 2,961,526 | 11/1960 | Dykes | 219—212 X |
| 3,119,926 | 1/1964 | Mills et al. | 219—212 |

RICHARD M. WOOD, *Primary Examiner.*

UNITED STATES PATENT OFFICE
CERTIFICATE OF CORRECTION

Patent No. 3,222,497

December 7, 1965

Walter H. Gordon, Jr.

It is hereby certified that error appears in the above numbered patent requiring correction and that the said Letters Patent should read as corrected below.

Column 6, line 21, for "blanked" read -- blanket --; column 7, line 27, for "resisor" read -- resistor --; column 8, line 69, for "pattent" read -- pattern --.

Signed and sealed this 17th day of May 1966.

(SEAL)

Attest:

ERNEST W. SWIDER
Attesting Officer

EDWARD J. BRENNER
Commissioner of Patents